United States Patent [19]
Marshall

[11] Patent Number: 5,774,196
[45] Date of Patent: Jun. 30, 1998

[54] METHOD AND APPARATUS OF ALIGNING COLOR MODULATION DATA TO COLOR WHEEL FILTER SEGMENTS

[75] Inventor: Stephen W. Marshall, Richardson, Tex.

[73] Assignee: Texas Instruments Incorporated, Dallas, Tex.

[21] Appl. No.: 662,545

[22] Filed: Jun. 13, 1996

[51] Int. Cl.$^6$ ................................................. H04N 9/12
[52] U.S. Cl. .......................................... 348/743; 348/771
[58] Field of Search ................................ 348/743, 742, 348/771, 268, 269, 739, 270, 271, 68, 69, 70; H04N 9/12, 9/04, 5/66, 9/083, 7/18, 9/47

[56] References Cited

U.S. PATENT DOCUMENTS

| | | | |
|---|---|---|---|
| 3,821,793 | 6/1974 | Carson | 178/5.4 CF |
| 4,197,559 | 4/1980 | Gramling | 348/743 |
| 5,046,162 | 9/1991 | Ishikawa et al. | 358/42 |
| 5,192,946 | 3/1993 | Thompson et al. | 340/794 |
| 5,212,555 | 5/1993 | Stoltz | 348/771 |
| 5,233,385 | 8/1993 | Sampsell | 355/35 |
| 5,428,408 | 6/1995 | Stanton | 348/742 |
| 5,448,314 | 9/1995 | Heimbuch et al. | 348/771 |
| 5,452,024 | 9/1995 | Sampsell | 348/755 |
| 5,467,146 | 11/1995 | Huang et al. | 348/743 |

FOREIGN PATENT DOCUMENTS 0 511 829 A2   11/1992   European Pat. Off. .

OTHER PUBLICATIONS

Elektronik, Bildprojektion per Mikrochip, vol. 42, No. 20, Oct. 5, 1993, pp. 30, 32.

08/371,348 "DMD Modulated Continuous Wave Light Source for Zerographic Printer" Filed Jan. 11, 1995.

08/373,692 "Monolithic Programmable Format Pixel Array" filed Jan. 17, 1995.

08/414,707 "Spatial Light Imaging System with Synchronized and Modulated Light Source" filed Mar. 31, 1995.

*Primary Examiner*—Michael H. Lee
*Assistant Examiner*—Jean W. Désir
*Attorney, Agent, or Firm*—Robert C. Klinger; James C. Kesterson; Richard L. Donaldson

[57] ABSTRACT

A method and apparatus (10) of aligning color modulation data to color wheel filter segments (13) in a field sequential color spatial light modulator display system. A color wheel (12) having a plurality of colored segments (13) joined at spokes (14) is rotated before a narrow light beam (20). The colored light (22) is observed until light of a mixed color is detected, this light of mixed color corresponding to light of equal portions from the two segments adjacent the spoke. The time between a wheel marker (42) is detected and when the predetermined mixed color is observed is measured. Optical sensors (50) can be utilized to sense a mixed color, such as magenta derived from the combination of a red/blue transition, but also can be done manually by briefly illuminating the wheel to visually ascertain this predetermined color. By calibrating the display system to know precisely where the spokes (14) are, referenced in time to when a wheel marker (42) is detected, colored modulation data for each colored segment is only fed to the SLM (26) during the time the corresponding color filter is in the light path.

9 Claims, 1 Drawing Sheet

METHOD AND APPARATUS OF ALIGNING COLOR MODULATION DATA TO COLOR WHEEL FILTER SEGMENTS

CROSS REFERENCE TO RELATED APPLICATIONS

Cross reference is made to the following commonly assigned co-pending patent applications, the teachings included herein by reference:

| Ser. No. | TITLE | FILING DATE |
| --- | --- | --- |
| 08/179,028 | Method and Apparatus for Sequential Color Imaging | 01/07/94 |
| 08/146,385 | DMD Display System | 11/01/93 |
| 08/221,739 | Illumination Control Unit for Display System with Spatial Light Modulator | 03/31/94 |
| 08/371,348 | DMD Illuminator Switch | 01/11/95 |
| 08/373,692 | Monolithic Programmable Digital Micro-Mirror Device | 01/17/95 |
| 08/414,707 | Spatial Light Imaging System with Synchronized and Modulated Light Source | 03/31/95 |
| TI-20091 # (Attorney's Docket) | Sequential Color Display System with Spoke Synchronous Frame Rate Conversion | 6/08/95 |

FIELD OF THE INVENTION

The present invention generally relates to field sequential color display systems, and more particularity, to a method and apparatus for aligning color modulation data to color wheel filter segments to avoid a spatial light modulator from modulating incident light being other than a pure color, such as light colored by the interface or spoke defined between adjacent colored segments.

BACKGROUND OF THE INVENTION

In many spatial light modulator (SLM) display systems using field sequential color rendition, a color wheel including filters of the three primary colors, namely red, blue and green, passes these colored filters in the beam path between a light source and the SLM. One such system is disclosed in commonly assigned U.S. Pat. No. 5,233,385 to Sampsell, entitled "White Light Enhanced Color Field Sequential Projection" and U.S. Pat. No. 5,192,946 to Thompson, et al. entitled "Digitized Color Video Display System" which implements a digital micromirror device (DMD) to modulate incident light and form a light image.

Modulation data for each color is fed to the SLM during the time the corresponding color filter is in the light path. The color wheel is usually placed at a point where the light beam is narrow to minimize the transition time for filter segment boundaries or spokes to pass through the light beam, thus maximizing the light efficiency of the SLM display system. During the spoke time, also referred to as a blank time, that is, the time the light beam is being colored by two filters across the segment boundary (spoke), the SLM must be turned off to prevent modulating a mix of color light from both adjacent filter segments. Therefore, the presentation of modulation data to the SLM must be carefully aligned to the color wheel position to keep within the associated filter segment boundary and to avoid modulating light during the spoke time blanking period. To complete the synchronization of the system, the color wheel rate is usually phase locked to the vertical frame rate signal VSYNC of the incoming video data. The stream of processed field sequential color data to the SLM is then timed off of a timing mark on the color wheel.

There is a need in the art to compensate for mechanical tolerance build-ups and electronic circuit delays, including compensating for the delay between when the wheel reference marker is sensed, and when one of the color segments is actually coloring the light beam. This is due to the fact that the angular relationship between where a sensor senses the wheel marker and where the light beam illuminates the wheel may vary slightly. The prior art method of making this adjustment is tedious and labor intensive, involving special test equipment including oscilloscopes and photodiodes, to see the modulation sequence in the modulated light and center it between the filter spokes. This method is especially unsuitable for field alignment and repair depots.

SUMMARY OF THE INVENTION

The present invention achieves technical advantages by illuminating a color wheel filter boundary during a normal blanking time to generate a predetermined color, and determining that the time delay from the reference marker is correct by detecting the predetermined color. For instance, the color magenta will be generated, which is an equal contribution of blue and red light if illumination time is correctly centered over the red/blue boundary. If the timing of the spoke relative to the reference marker is incorrect, the color observed will be bluer or redder depending on the direction of the error. In this way, it can be precisely determined when in time a spoke is being illuminated after the reference marker is sensed. An automatic servo or manual timing adjustment then aligns the modulation data feed for each color to the time the corresponding color filter is known to be in the light path, and not when any filter spoke is in the light path. This avoids modulating light of mixed colors which are generated should a spoke be illuminated and the corresponding light be modulated, while maximizing the light efficiency of the system by minimizing the allocated blanking times.

The display system comprises a light source generating light. A rotatable color wheel has a wheel marker and a plurality of colored segments sequentially coloring the light, these segments interconnected at spokes. A spatial light modulator modulates this colored light. A first sensor senses the wheel reference marker and provides a first sensor output indicative of the sensed marker. A second sensor senses a color of the colored light, and provides a second sensor output indicative of this color. A calibration circuit determines when the spoke is illuminated as a function of the first sensor output and the second sensor output, and generates an output indicative of this period. A control circuit controls the spatial light modulator to modulate the colored light from the color wheel as a function of the calibration circuit output.

By establishing the precise time after a wheel marker is sensed that a predetermined color is being generated by a filter spoke, the control circuit can feed color modulation data to the SLM only during a time the corresponding color filter is known to be in the light path, and not when a spoke is being illuminated known as the blanking period. This minimizes the transition time that needs to be allotted for a filter segment boundary (spoke) to pass through the light beam, thus maximizing the light efficiency of the SLM display system.

In the preferred embodiment of the present invention, at least a pair of optical sensors are utilized to sense the colored light being directed upon the spatial light modulator. Each optical sensor is tuned to sense a different predetermined color and provide a respective second sensor output. The calibration circuit establishes when the spoke is centered in the light beam as a function of the two sensor outputs. This is done by detecting the magnitude of the two sensor outputs, and preferably, by determining that when the magnitude of the two sensor outputs are identical, a spoke is centered in the light path. For instance, if the spoke between a red and blue segment is being illuminated, a magenta color is generated. When the outputs of optical sensors are identical in magnitude, one sensor being tuned to the red spectrum, and the other being tuned to the blue spectrum, the spoke is known to be centered in the light beam.

A method of aligning color modulation data to color wheel filter segments in a field sequential color display system comprises the steps of rotating a color wheel having a reference marker and a plurality of colored segments joined at spokes. The wheel reference marker is detected, and a portion of the color wheel colors light at a first predetermined time after detecting the reference marker. The color of the colored light is detected, whereby the first predetermined time is adjusted until the color of the detected light is a predetermined color. For instance, if a blue/red interface or spoke is being illuminated, the first predetermined time is adjusted until a pure magenta color is detected, which is an equal contribution of the red and blue light. At this time, the spoke is known to be centered in the light beam being colored. This detection of the light color can be done automatically using devices such as optical sensors set forth in the apparatus of the preferred embodiment of the present invention, or, done manually by simply detecting this predetermined color with the human eye by illuminating the color wheel only briefly, such as 15 microseconds, which can correspond to the least significant bit for pulse width modulation techniques. While only briefly illuminating the spoke to only illuminate the adjacent portions of the colored segments passing the light at a particular time, the operator can precisely set the adjustment of this predetermined time to accuracy within several microseconds. Thus, the method of the present invention can be performed either automatically with an apparatus, or, manually using the human eye to visually ascertain a predetermined color of the light being illuminated at the particular time after detecting a reference marker. If done automatically, the apparatus can be embodied into the display system and performed automatically by a consumer, such as using buttons on a remote control, but also could be done manually by trained technicians for field alignment and repair depots.

DETAILED DESCRIPTION OF THE PREFERRED EMBODIMENT

Figure 1:
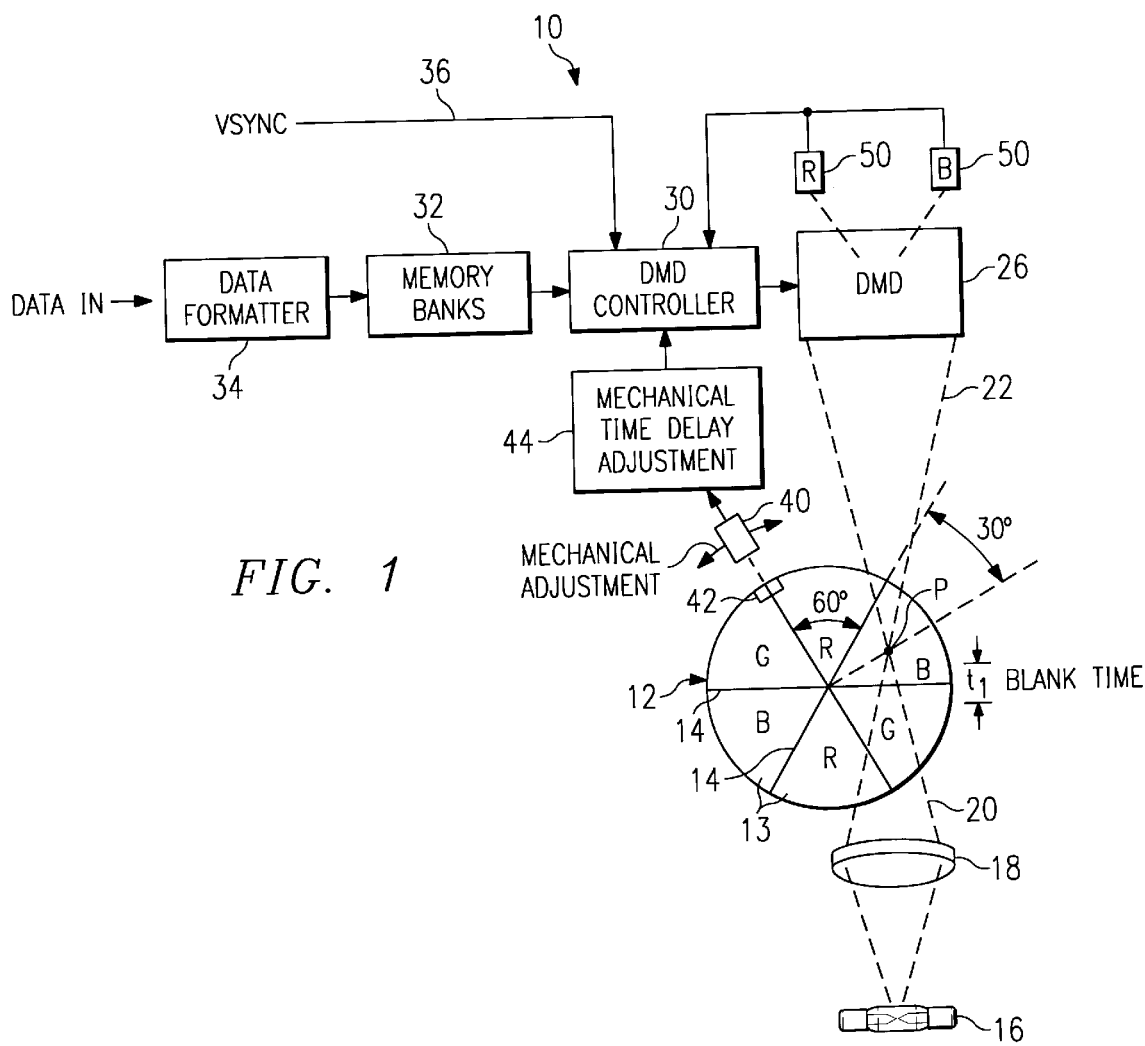
FIG. 1 is a block diagram of a field sequential color spatial light modulator display system according to the preferred embodiment of the present invention, whereby a pair of optical sensors are utilized to determine the time at which a spoke passes through the light beam after sensing a wheel marker.

Referring now to FIG. 1, there is generally shown at 10 a field sequential color spatial light modulator display system according to the preferred embodiment of the present invention. System 10 is seen to include a color wheel 12 partitioned into a plurality of equally sized colored segments 13, namely, a pair of blue segments, a pair of red segments, and a pair of green colored segments each extending arcuately 60 degrees. Defined at the interface of each adjacent pairs of colored segments is a spoke, generally shown at 14. A lamp, such as a metal halide arc lamp, generally shown at 16 has its light output focused by a lens 18 onto a small portion of color wheel 12 being rotated before lens 18. The light beam, generally shown at 20, is narrow at the point of illumination, shown as point P, to minimize the transition time required for the filter segment boundaries or spokes 14 to pass through the light beam, thus maximizing the light efficiency of the display system. Light beam 20 is colored by the respective segment 13 in the path of the beam, this colored light being shown at 22 and homogeneously illuminating a spatial light modulator, shown as a digital micromirror device (DMD) generally shown at 26, but limitation to a DMD is not to be inferred. Such a DMD spatial light modulator 26 is discussed in considerable detail in the commonly assigned cross referenced patents discussed in the section entitled Background of the Invention, the teachings of each included herein by reference. Essentially, DMD SLM 26 comprises an area array of tiny micromirrors which modulate the incident colored light by deflecting the light into either a projector lens, or to a light absorber. The DMD 26 modulates the incident light to form a light image, the light image being focused upon a display screen, or onto a photoreceptor drum of a xerographic printer, depending on the application.

A microprocessor based DMD controller 30 receives digital color data from one of a plurality of RAM memory banks 32. The digital color data is retrieved by controller 30 for each frame of data to be displayed by DMD 26, depending on which colored segment is currently being illuminated by lamp 16. The stream of video data is provided into memory banks 32 by a data formatter 34, in synchronism with a vertical sync pulse VSYNC on line 36.

According to the preferred embodiment of the present invention, an optical sensor 40 is utilized to sense a wheel marker 42, defined at the perimeter of color wheel 12, as it rotates past the sensor. DMD controller 30 writes digital color data to DMD 26 for display a predetermined time after detecting this wheel marker 42, corresponding to which colored segment is being illuminated by lamp 16, as will now be discussed in more detail.

As shown, a pair of tuned optical sensors 50 are oriented to sense light being reflected from some of the micromirrors (not shown) of DMD 26 when they are in the off position, that is, not reflecting light to the projector lens. One optical sensor may be tuned to sense light having a wavelength corresponding to red, the color of one segment 13, and the other sensor being tuned to detect light having a wavelength corresponding to blue, the color of an adjacent segment 13. Each sensor provides an output indicative of the magnitude of the specific light being sensed. DMD controller 30 calibrates system 10 by setting the precise time period after sensor 40 detects the wheel marker 42 that the outputs by the red and blue optical sensors 50 have identical outputs in magnitude, corresponding in time to when the red/blue spoke 14 is centered in and illuminated by beam 20. If wheel 12 is rotating at about 60 hertz, which is typical of an NTSC display system, and the color wheel is divided into six equal arcuate segments of 60°, the wheel rate period is about 16.67 milliseconds, whereby each colored segment is illuminated from ⅙ that period, namely, 2.77 milliseconds each. The mechanical orientation of just where the light beam 20 is focused on wheel 12, relative to where marker 42 is sensed by sensor 40, will vary slightly from system to system. Therefore, it is imperative that it be known by controller 30 what colored segment is being illuminated, and when a spoke is illuminated, this being done in the present invention by determining when in time after when the wheel marker 42 is detected that a color of equal mix from 2 adjacent colored segments is by sensors 50.

As shown by way of illustration in FIG. 1, but without any limitation intended, if light from lamp 16 is focused by lens 18 onto the color wheel at an angular position 90° from where sensor 40 is detecting wheel marker 42, with the wheel 12 rotating at 60 hertz, there is a time delay of 16.67 milliseconds divided by 4, which equals 4.17 milliseconds to when the red/green spoke associated with marker 42 will be illuminated by light source 16, generally shown at point P. Of course, the specific orientation of point P in the angular direction relative to sensor 40 may vary from system to system. Using the present invention, controller 30, in combination with sensors 50, determines exactly when in time the red/blue interface 14, or any other interface 14 if desired, is illuminated at point P, after reference marker 42 is detected by sensor 40. Since all spokes are spaced equidistantly from each other 60 degrees, knowing the period of wheel 12, the time all the spokes are illuminated is known.

DMD controller 30 is referenced to a high frequency crystal oscillator (not shown), whereby the precise moment in time that the red and blue sensors 50 provide outputs of equal magnitude, after reference marker 42 is detected by sensor 40, can be ascertained, preferably within 10 microseconds. Thereafter, in during normal operation, DMD controller 30 will know precisely where all the spokes 14 are, and thus which colored segment is being illuminated at any given time. By knowing precisely where the spokes 14 in time, in reference to sensing the wheel marker 42, DMD controller 30 timely writes the various digital color data from memory banks 32 to SLM 26 to modulate the correspondingly colored light and create a light image, and without modulating light of mixed colors. The blank time that is associated with when one spoke 14 is being illuminated at point P by lamp 16 is generally shown as the window identified as $T_1$. In the present invention, this blank time corresponds approximately 200 microseconds. With the present invention, this window is relatively small and centered about the spokes. This 200 microsecond window blank time can be adjusted plus or minus increments of about 10 microseconds such that the window is always centered about the respective spokes.

Figure 2:
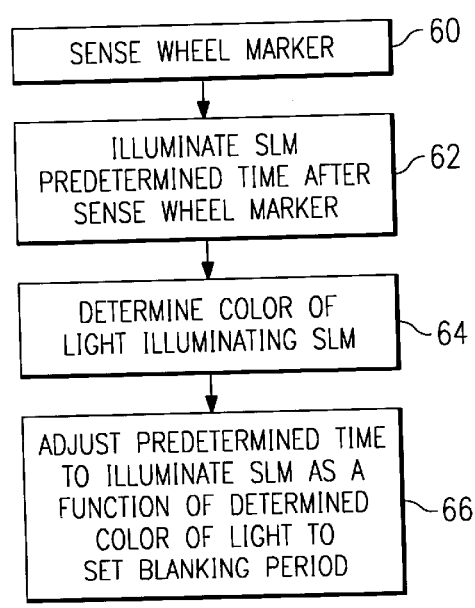
FIG. 2 is a flow diagram of a method according to the preferred embodiment of the present invention for aligning the color modulation data to the color wheel filter segments in the display system, whereby color modulation data for each color segment is fed to the SLM during the time corresponding to the color filter that is in the light path.

Referring now to FIG. 2, a flow diagram of a method according to the preferred embodiment of the present invention is shown. This method can be performed manually by perceiving the color using the human eye, and making an electrical or mechanical adjustment, but also could be performed with the apparatus of FIG. 1, using the sensors 50. In other words, the DMD 10 can be briefly illuminated during a blanking window, say, for a short period of about 15 microseconds corresponding to the least significant bit of an SLM with 8-bits of dynamic range per color running at 60 hertz frame rate. By using the human eye to determine when a magenta color is observed after when sensor 40 senses the optical marker 42, a technician can align and calibrate when digital colored modulation data is being fed to the SLM, such that it corresponds in time to when the corresponding color filter is in the light path.

At step 60, the optical sensor 40 detects the wheel marker 42 and provides an output indicative thereof. At step 62, the SLM 26 is illuminated a predetermined time after sensing this wheel marker. At step 64, using the human eye, the color of light illuminating the SLM 26 is determined. At step 66, a predetermined time in controller 30 which determines the blanking time is adjusted until a magenta color is observed, which again, is the equal combination of red and blue light. This predetermined time can be adjusted manually using dip switches or a potentiometer, for instance, shown as a mechanical time delay adjustment shown at 44. Alternatively, the position of sensor 40 can be arcuately adjusted and fixed using a set screw, as shown by the arrows in FIG. 1. The DMD controller 30 uses this set predetermined time in normal operation to insure that color modulation data is fed to the SLM only during the time that a color filter is in the light path, and not when a filter spoke is present. As shown in FIG. 1, DMD controller 30 can automatically determine, store and utilize the delay time using a pair of optical sensors 50 as previously discussed.

A technical advantage of the present invention is that each particular display system can be precisely tuned and calibrated such that the DMD controller 30 knows precisely where the illumination point P of the light is focused in angular relation to when the marker 42 is sensed by a sensor 40. That is, if point P is 90° angularly away from where marker 42 is being sensed, as shown in FIG. 1, and with the wheel being rotated at precisely 60 hertz frame rate, controller 30 knows precisely when a spoke 14 will lie across point P. During this blanking time, color modulation data is not written to DMD 26 for modulation. This blanking time is minimized, such as set to 200 microsecond, corresponding to wheel rotation of 4.3 degrees, whereby the blanking period can be centered about the spoke in 10 microsecond increments, corresponding to a wheel rotation of 0.2° degrees. This maximizes the efficiency of the display system light. Whether done automatically by the apparatus of FIG. 1, or manually by visually ascertaining a predetermined color, such as magenta, the system 10 can be calibrated and aligned either in the factory, in the field or at repaired depots. The present invention allows quick and easy alignment without the need for special test equipment, such as oscilloscopes and photodiodes, and the associated tedious and labor intensive process of matching a modulation sequence in modulated light between filter spokes.

Though the invention has been described with respect to a specific preferred embodiment, many variations and modifications will become apparent to those skilled in the art upon reading the present application. For instance, illuminating a blue/green spoke to observe a cyan color, or illuminating a red/green spoke to observe a yellow color could also be performed. It is therefore the intention that the appended claims be interpreted as broadly as possible in view of the prior art to include all such variations and modifications.

I claim:

1. A display system, comprising:
   a light source generating light;
   a rotatable color wheel coloring said light having a plurality of colored segments and a reference marker, said segments interconnected at a spoke;
   a spatial light modulator modulating said colored light;
   a first sensor sensing said wheel reference marker and providing a first sensor output indicative of said sensed marker;
   a second sensor sensing a color of said colored light and providing a second sensor output indicative of said sensed color;

a calibration circuit determining when said spoke is illuminated as a function of said first sensor output and said second sensor output and generating an output; and a control circuit controlling said spatial light modulator to modulate said colored light from said color wheel as a function of said calibration circuit output.

2. The display system as specified in claim 1 wherein said second sensor comprises at least one optical sensor.

3. The display system as specified in claim 2 wherein said second sensor comprises a pair of optical sensors, each said optical sensor tuned to sense a different predetermined color of light and providing a respective said second sensor output, said calibration circuit establishing when said spoke is illuminated as a function of said two second sensor outputs.

4. The display system as specified in claim 3 wherein said calibration circuit establishes detection of said spokes when the magnitude of said two sensor outputs are identical.

5. The display system as specified in claim 1 wherein said first sensor is angularly oriented a predetermined distance from said second sensor.

6. A method of aligning color modulation data to color wheel filter segments in a field sequential color display system, comprising the steps of:

(a) rotation a color wheel having a reference marker and a plurality of colored segments joined at a spoke;

(b) detecting said reference marker;

(c) illuminating a portion of said color wheel at a first predetermined time after detecting said reference marker;

(d) detecting a color of said colored light; and (e) adjusting said first predetermined time until said color of said detected light is a predetermined color.

7. The method as specified in claim 6 further comprising the step of modulating said colored light from said color wheel as a function of said predetermined time.

8. The method as specified in claim 7 further comprising the step of utilizing a DMD spatial light modulator having an array of pixel mirrors to modulate said colored light.

9. The method as specified in claim 8 further comprising the step of coordinating pulse width modulation of said pixel mirrors as a function of said predetermined time to align an on time of said pixel mirrors to illumination of said colored segments.

* * * * *